(12) United States Patent
Ouchi (10) Patent No.: US 12,368,544 B2
(45) Date of Patent: Jul. 22, 2025

(54) COMMUNICATION APPARATUS THAT SELECTIVELY PERMITS SPATIAL REUSE PARAMETER BASED COMMUNICATION, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 380 days.

(21) Appl. No.: 17/712,582

(22) Filed: Apr. 4, 2022

(65) Prior Publication Data
US 2022/0224462 A1     Jul. 14, 2022

Related U.S. Application Data

(63) Continuation of application No. 16/781,202, filed on Feb. 4, 2020, now Pat. No. 11,323,216.

(30) Foreign Application Priority Data

Feb. 26, 2019   (JP) ................. 2019-033029

(51) Int. Cl.
*H04W 72/04*   (2023.01)
*H04L 5/00*     (2006.01)
(Continued)

(52) U.S. Cl.
CPC .......... *H04L 5/0007* (2013.01); *H04L 5/0035* (2013.01); *H04L 5/0037* (2013.01);
(Continued)

(58) Field of Classification Search
CPC ... H04L 5/0007; H04L 5/0035; H04L 5/0037; H04L 5/0044; H04L 5/0091;
(Continued)

(56) References Cited

U.S. PATENT DOCUMENTS 9,801,184 B2    10/2017 Noh
9,894,653 B2    2/2018 Huang
(Continued)

FOREIGN PATENT DOCUMENTS

JP    2018537886 A      12/2018
JP    2020141159 A       9/2020
WO  WO-2018084404 A1 *  5/2018

OTHER PUBLICATIONS

Mediatek, IEEE 802.11-16/1216r2 SR Field SRP Table for He Trigger-Based PPDU, Sep. 11, 2016 (Year: 2016).*
(Continued)

*Primary Examiner* — Mahbubul Bar Chowdhury
(74) *Attorney, Agent, or Firm* — ROSSI, KIMMS & McDOWELL LLP (57) ABSTRACT

A communication apparatus transmits a frame including frequency band allocation information for communication based on Orthogonal Frequency Division Multiple Access (OFDMA), and determines whether to permit or prohibit Spatial Reuse Parameter (SRP) based communication in accordance with a communication partner apparatus of each of a plurality of terminal stations in a network managed by the communication apparatus. The communication apparatus, in a case where it is determined that the SRP based communication is to be prohibited, transmits the frame including information indicating that the SRP based communication is prohibited.

7 Claims, 7 Drawing Sheets

(51) Int. Cl.
*H04W 72/0453* (2023.01)
*H04W 72/21* (2023.01)
*H04W 72/23* (2023.01)
*H04W 76/12* (2018.01)

(52) U.S. Cl.
CPC ....... *H04L 5/0044* (2013.01); *H04W 72/0453* (2013.01); *H04W 72/21* (2023.01); *H04W 72/23* (2023.01); *H04W 76/12* (2018.02)

(58) Field of Classification Search
CPC . H04W 72/0453; H04W 72/21; H04W 72/23; H04W 76/12; H04W 76/14; H04W 52/243; H04B 7/0697; H04B 17/318; Y02D 30/70

See application file for complete search history.

(56) References Cited

U.S. PATENT DOCUMENTS

| | | | |
|---|---|---|---|
| 10,171,420 | B2 | 1/2019 | Cariou |
| 10,366,064 | B2 | 7/2019 | Cariou |
| 10,375,695 | B2 | 8/2019 | Chu |
| 10,470,128 | B2 | 11/2019 | Noh |
| 10,623,964 | B2 | 4/2020 | Ko |
| 10,701,730 | B2 | 6/2020 | Kim |
| 10,841,943 | B2 | 11/2020 | Holfeld |
| 10,873,973 | B2 | 12/2020 | Ko |
| 11,051,297 | B2 | 6/2021 | Patil |
| 2017/0064644 | A1 | 3/2017 | Cariou |
| 2017/0188368 | A1* | 6/2017 | Cariou .............. H04W 74/0808 |
| 2017/0230837 | A1* | 8/2017 | Huang ................. H04W 80/02 |
| 2018/0062805 | A1 | 3/2018 | Huang |
| 2018/0220456 | A1* | 8/2018 | Kim ........................ H04W 74/06 |
| 2018/0242331 | A1* | 8/2018 | Zhu ........................ H04W 72/23 |
| 2018/0292518 | A1 | 10/2018 | Chu et al. |
| 2019/0021007 | A1 | 1/2019 | Zhou |
| 2019/0028898 | A1* | 1/2019 | Ko .......................... H04W 52/34 |
| 2019/0132872 | A1* | 5/2019 | Ko .......................... H04L 47/824 |
| 2019/0230703 | A1* | 7/2019 | Lv .......................... H04B 17/318 |
| 2019/0327741 | A1* | 10/2019 | Li ......................... H04W 74/002 |
| 2020/0128527 | A1* | 4/2020 | Muraoka ............... H04W 72/51 |
| 2020/0274659 | A1 | 8/2020 | Ouchi |
| 2020/0359417 | A1* | 11/2020 | Ko .......................... H04W 74/0808 |
| 2020/0396742 | A1* | 12/2020 | Park ...................... H04W 76/11 |
| 2021/0014695 | A1* | 1/2021 | Minotani .............. H04W 72/04 |
| 2021/0028897 | A1* | 1/2021 | Park ...................... H04L 5/0094 |
| 2021/0084686 | A1 | 3/2021 | Zhang |
| 2022/0338261 | A1* | 10/2022 | Nunome ........... H04W 74/0816 |

OTHER PUBLICATIONS

NPL Realtek, IEEE 802.11-17/0748r1, Supplementary instructions related to OBSS_PD spatial reuse Disallow / Prohibit, May 10, 2017 (Year: 2017).*

Fischer. "SRP-Based SR for HE Trigger-based PPDU-27.9.3." IEEE802.11-16/1476r17, and IEEE, Internet <URL: https://mentor.ieee.org/802.11/dcn/16/11-16-1476-17-00ax-cr-for-section-25-9-spatial-reuse-operation-for-he-ppdu.docx>. Feb. 23, 2017.

Office Action issued in U.S. Appl. No. 16/781,202 mailed Sep. 10, 2021.

Notice of Allowance issued in U.S. Appl. No. 16/781,202 mailed Jan. 11, 2022.

* cited by examiner

| 401 | 402 | 403 | 404 |
|---|---|---|---|
| Spatial Reuse 1 | Spatial Reuse 2 | Spatial Reuse 3 | Spatial Reuse 4 |
| Bits: 4 | 4 | 4 | 4 |

| Value | Meaning |
|---|---|
| 0 | SRP_DISALLOW |
| 1 | SRP = -80dBm |
| 2 | SRP = -74dBm |
| 3 | SRP = -68dBm |
| 4 | SRP = -62dBm |
| 5 | SRP = -56dBm |
| 6 | SRP = -50dBm |
| 7 | SRP = -47dBm |
| 8 | SRP = -44dBm |
| 9 | SRP = -41dBm |
| 10 | SRP = -38dBm |
| 11 | SRP = -35dBm |
| 12 | SRP = -32dBm |
| 13 | SRP = -29dBm |
| 14 | SRP ≥ -26dBm |
| 15 | SRP_AND_NON_SRG_OBSS_PD_PROHIBITED |

FIG. 7

COMMUNICATION APPARATUS THAT SELECTIVELY PERMITS SPATIAL REUSE PARAMETER BASED COMMUNICATION, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention relates to a communication technology for efficiently using a wireless medium.

Description of the Related Art

In recent years, the IEEE 802.11ax standard intended for efficient use of a wireless medium in an environment where a plurality of communication apparatuses are present has been studied. In this study, introduction of spatial reuse communication using a Spatial Reuse Parameter (SRP) has been studied in order for a plurality of communication apparatuses in a plurality of Basic Service Sets (BSSs) to effectively use the wireless medium (US-2018-0062805). The SRP is information included in a trigger frame transmitted from an access point managing one BSS. In a case where a terminal belonging to another BSS receives the information, performing a transmission process using the information enables efficient use of the wireless medium.

For the above-described communication method using the SRP, only uplink communication is assumed as a directionality of communication. That is, the destination of a frame for which transmission is guided by the trigger frame is assumed to be the access point having transmitted the trigger frame. Thus, in a case where communication other than the uplink communication is assumed, for example, in a case where the destination of the frame for which the transmission is guided by the trigger frame is other than the access point, the frame transmitted by the terminal may cause a failure in reception process at the access point. That is, the access point may fail to correctly receive frames destined for the access point because the frames are interfered with by the frame having a destination other than the access point.

SUMMARY OF THE INVENTION

In light of the above problems, the present disclosure provides a technology for performing communication control in accordance with the directionality of communication.

According to one aspect of the present invention, there is provided a communication apparatus which comprises: a transmission unit configured to transmit a frame including frequency band allocation information for communication based on Orthogonal Frequency Division Multiple Access (OFDMA); and a determination unit configured to determine whether to permit or prohibit Spatial Reuse Parameter (SRP) based communication in accordance with a communication partner apparatus of each of a plurality of terminal stations in a network managed by the communication apparatus, wherein in a case where the determination unit determines that the SRP based communication is to be prohibited, the transmission unit transmits the frame including information indicating that the SRP based communication is prohibited.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Wireless Network Configuration)

Figure 1:
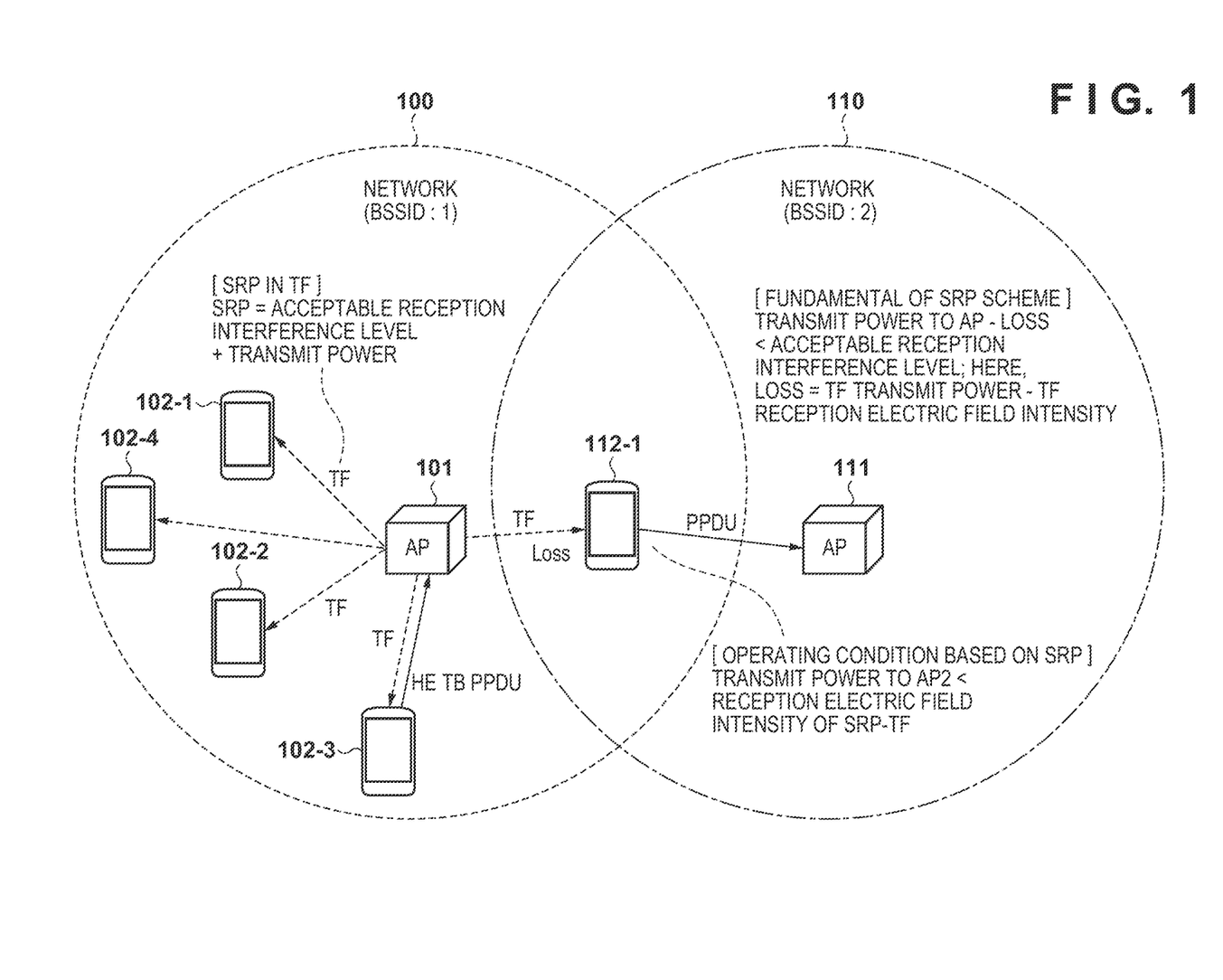
FIG. 1 illustrates an example of a wireless network configuration.

FIG. 1 illustrates an example of a wireless network configuration according to the present embodiment. In FIG. 1, a network 100 and a network 110 are illustrated as two Basic Service Set (BSS) networks. A BSS is a base set of wireless networks, and in an infrastructure mode, the BBC is formed and managed by an access point used as a controller. The network 100 is a network with a BSS Identifier value (ID) of 1, and the network 110 is a network with a BSS ID of 2. Note that BSS ID is an identifier of the BSS and, in this case, the address of an access point in a Medium Access Control (MAC) frame configuration is used as the BSS ID, but note that no such limitation is intended.

An access point (AP) 101 is an access point managing the network 100 and supporting IEEE 802.11ax. Similarly, an AP 111 is an access point managing the network 110 and supporting IEEE 802.11ax. According to IEEE 802.11ax, at least a part of a 20-MHz frequency bandwidth may be allocated to one or more stations/terminal stations (STAs) by orthogonal frequency division multiple access (OFDMA). STAs 102-1 to 102-3 are communication terminals (terminal stations) belonging to the network 100, and an STA 112-1 is a communication terminal belonging to the network 110.

(Configuration of AP)

Figure 2A:
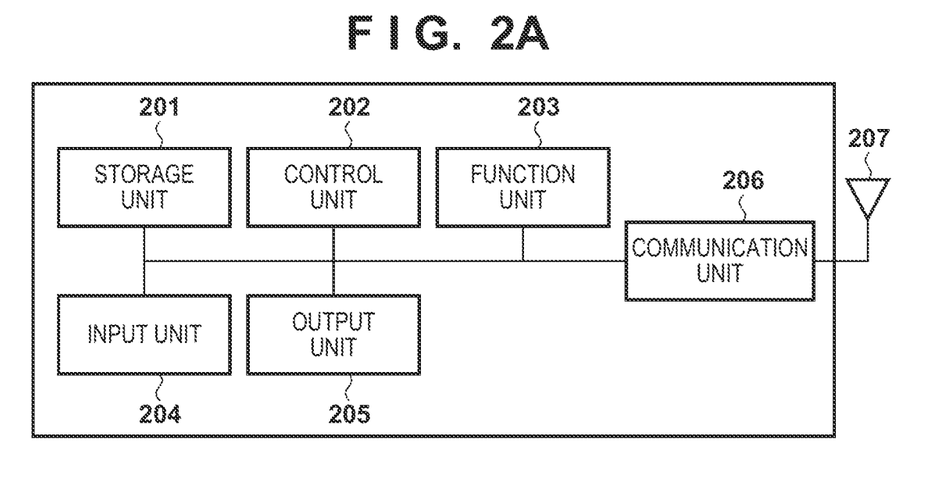
FIG. 2A illustrates an example of a hardware configuration for an access point.

FIG. 2A illustrates an example of a hardware configuration of an AP 101. A storage unit 201 is constituted of a memory such as a ROM or a RAM, and stores various types of information such as programs for performing various operations described below and communication parameters for wireless communication. Note that, in addition to a memory such as a ROM, a RAM, or the like, a storage medium such as a flexible disk, a hard disk, an optical disc, a magneto-optical disc, a CD-ROM, a CD-R, a magnetic tape, a non-volatile memory card, or a DVD may be used as the storage unit 201. Additionally, the storage unit 201 may include a plurality of memories.

A control unit 202 is constituted of one or more processors, such as a CPU and an MPU, and controls the AP 101 by executing programs stored in the storage unit 201. Note that the control unit 202 may control the AP 101 through cooperation between an Operating System (OS) and a program stored in the storage unit 201. Additionally, the control unit 202 may include a plurality of processors such as a multi-core processor and control the AP 101. Additionally, the control unit 202 may control a function unit 203 to perform a predetermined process such as access point functions, imaging and printing, and projection. The function unit 203 is hardware for the AP 101 to perform a predetermined process.

An input unit 204 accepts various operations from a user. An output unit 205 provides various outputs to the user. Here, the output from the output unit 205 includes at least one of display on a screen, audio output from a speaker, vibration output, and the like. Note that both the input unit 204 and the output unit 205 may be implemented in one module, such as a touch panel. A communication unit 206 controls wireless communication in accordance with IEEE 802.11 series or Wi-Fi, and controls Internet Protocol (IP) communication. For example, the communication unit 206 can perform communication corresponding to IEEE 802.11ax or communication not corresponding to IEEE 802.11ax. The communication unit 206 can control an antenna 207 to transmit and receive wireless signals for wireless communication.

Figure 2B:
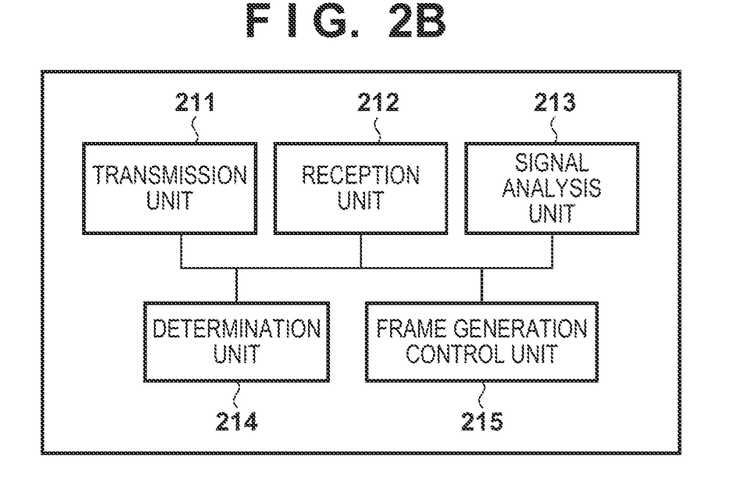
FIG. 2B illustrates an example of a functional configuration of the AP.

FIG. 2B illustrates an example of a functional configuration of the AP 101. A transmission unit 211 and a reception unit 212 respectively perform signal transmission processing and signal reception processing via the communication unit 206. A signal analysis unit 213 performs analysis on a received signal processed by the reception unit 212. A determination unit 214 determines the directionality (communication partner apparatus) of communication in the network managed by the AP 101 in accordance with an analysis result from the signal analysis unit 213. A frame generation control unit 215 performs control related to generation of a frame (for example, a trigger frame) transmitted by the AP 101.

(Configuration of Trigger Frame)

Figure 3A:
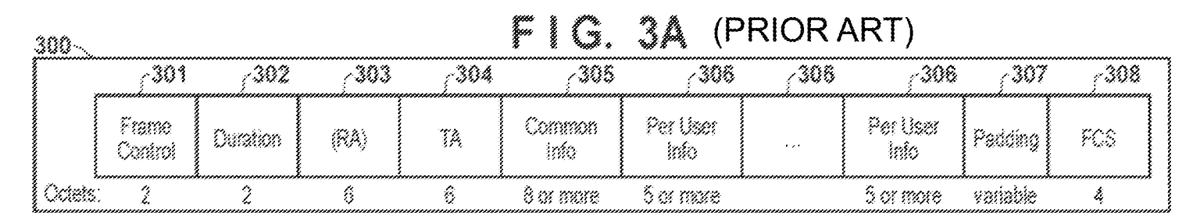
FIG. 3A illustrates an overall configuration of a trigger frame.

FIG. 3A illustrates a configuration of a trigger frame (TF) 300. The TF is a frame defined by IEEE 802.11ax and used to indicate activation timings and wireless channel (frequency band) information needed for a plurality of STAs to transmit and receive frames. A Frame Control Field 301 is a field common to the IEEE 802.11 series, and in the present embodiment, contains a value indicating the TF for IEEE 802.11ax. A Common Info field 305 indicates information common to a plurality of STAs to which the TF 300 is to be addressed. Details of the Common Info field 305 will be described below using FIG. 3B. A Per User Info field 306 illustrates individual information for the destination of the TF 300. Details of the Per User Info field 306 will be described below using FIG. 3C. Note that descriptions of the fields Duration 302, Receiver Address (RA) 303, Transmitter Address (TA) 304, Padding 307, and (Frame Check Sequence (FCS) 308 complying with the IEEE 802.11ax standard are omitted.

Figure 3B:
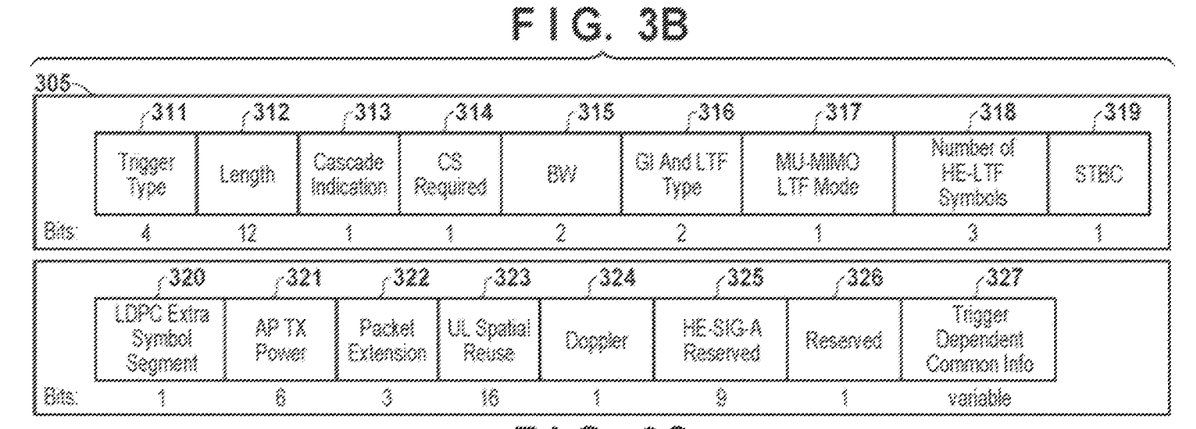
FIG. 3B illustrates a configuration of a Common Info field.

FIG. 3B illustrates a subfield configuration of the Common Info field 305. A Trigger Type subfield 311 indicates the type of trigger, and in a case where the TF 300 is a Basic Trigger Frame, this subfield is 0. The TF with a Trigger Type 311 of 0 is intended to allocate resource units (RUs) to a plurality of STAs and to activate communication after a Short Inter Frame Space (SIFS) time has elapsed since communication of the TF. Here, RU is an abbreviation for Resource Unit, and indicates an allocation unit of subcarriers (frequency bands) in OFDMA communication. A Length subfield 312 indicates the time (duration) of a frame activated by the TF. The value of the Length subfield 312 is reflected in an L-SIG field for a physical layer in an IEEE 802.11 frame. Here, L-SIG is an abbreviation for Legacy SIGNAL or non-high-throughput SIGNAL. Here, the Length subfield 312 is set and used to indicate the duration of the frame. A Bandwidth (BW) subfield 315 is 0 in a case where an operating channel band is 20 MHz. Descriptions of the following subfields complying with the IEEE 802.11ax standard are omitted: Cascade Indication 313 (also referred to as More TF), Carrier Sense (CS) Required 314, Guard Interval And Long Training Field (GI And LTF Type) 316, MU-MIMO LTF Mode 317, Number of HE LTF Symbols 318, Space Time Block Code (STBC) 319, Low Density Parity Check (LDPC), and Extra Symbol Segment 320. Note that MIMO is an abbreviation for Multiple Input Multiple Output and that HE is an abbreviation for High Efficiency and is used as a modifier meaning high efficiency according to the IEEE 802.11ax standard. An AP TX Power Subfield 321 is a value for transmit power for the TF 300 normalized based on a 20-MHz bandwidth, and a unit of the value is dBm. Details of UL Spatial Reuse 323 will be described below with reference to FIGS. 4A to 4B. Doppler 324 assumes a value of 0 or 1 in relation to the number of HE-LTF symbols. Descriptions of the subfields Packet Extension 322, HE-SIG-A Reserved 325, and Reserved 326 complying with the IEEE 802.11ax standard are omitted. Note that the designation HE-SIG-A is an expression representative of HE-SIG-A1 to HE-SIG-A4. A Trigger Dependent Common Info subfield 327 has a length that is variable (variable length), and indicates additional information in accordance with the value (type of TF) indicated by the Trigger Type subfield 311.

Figure 3C:
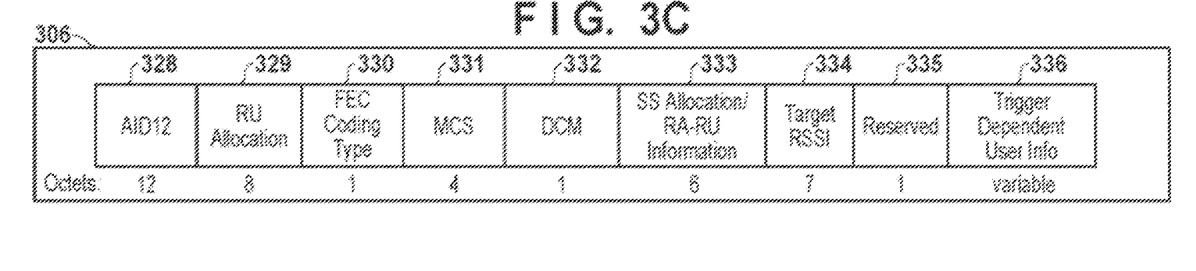
FIG. 3C illustrates a configuration of a Per User Info field.

FIG. 3C illustrates a subfield configuration of the Per User Info field 306. An Association IDentifier (AID) 12 subfield 328 is an identifier attached, for the purpose of distinction, by the access point to a terminal (STA) connected to the access point. A terminal having the same AID value as the value indicated by the AID12 subfield 328 corresponds to a target terminal of the Per User Info field 306, and uses an RU allocated in a succeeding RU Allocation subfield 329. Note that matching of the AID value is determined using 12 Least Significant Bits (LSBs). Additionally, subfield 328=0 indicates that, instead of a specific terminal, an arbitrary terminal is associated with (connected to) the AP. Additionally, AID12 subfield 328=2045 indicates that an arbitrary terminal is not associated with the AP. Furthermore, AID12 subfield 328=2046 indicates that no RU is allocated. The RU Allocation subfield 329 indicates an index of an RU to be allocated. An FEC Coding Type subfield 330 indicates the coding type of TF response data. An MCS subfield 331 indicates a coding scheme used in a TF response frame. Note that MCS is an abbreviation for Modulation and Coding Scheme. A DCM subfield 332 indicates Dual carrier modulation of the TF response frame. An SS Allocation/RA-RU Information subfield 333 is a spatial stream of the TF response frame when the AID of the terminal is neither 0 nor 2045. When the AID of the terminal is 0 or 2045, the subfield indicates a Random Access Resource Unit (RA-RU). A Target Receive Signal Strength Indicator (RSSI) subfield 334 indicates received power at the AP for the TF response frame expected by the AP. Description of a Reserved subfield 335 is omitted. A Trigger Dependent User Info 336 subfield is a subfield, the contents of which vary depending on Trigger Type 311.

Figure 4A:
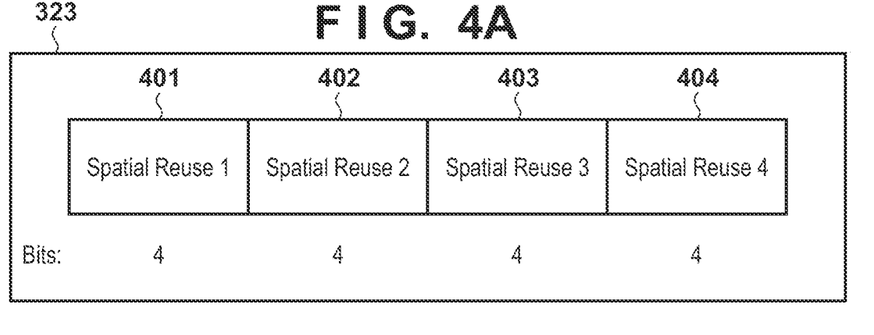
FIG. 4A illustrates a configuration of a UL Spatial Reuse field in the trigger frame.
Figure 4B:
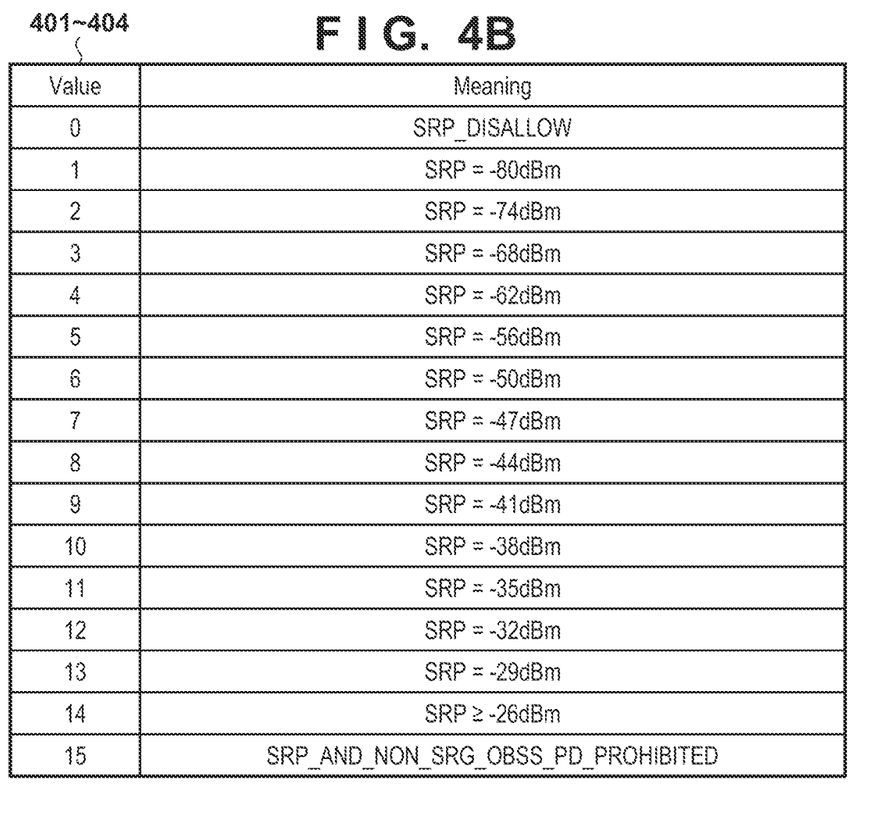
FIG. 4B illustrates the relationship between values of an SRP and meanings of the values.

FIG. 4A illustrates details of a UL Spatial Reuse field 323, which includes four 4-bit Spatial Reuse 1 to 4 subfields 401 to 404, respectively. Each Spatial Reuse subfield indicates a value of an SRP. FIG. 4B illustrates the values of the SRP and the meanings of the values. As illustrated in FIG. 4B, a case where an SRP value is 0 (zero) means that, after the transmission of the TF, no Spatial Reuse transmission is permitted (SRP_DISALLOW). Additionally, an SRP value of from 1 to 14 means a numerical value (dBm) obtained by adding the "transmit power for the TF" to the "level of reception interference acceptable by the AP (reception interference value)". Furthermore, an SRP value of 15 means prohibition of an SRP scheme and an OBSS_PD scheme (SRP_AND_NON_SRG_OBSS_PD_PROHIBITED). Note that OBSS_PD is an abbreviation for Overlapping BSS Packet Detection, and detailed description of the OBSS_PD is omitted.

(Description of Operation Sequence)

Now, an operation sequence according to the present embodiment in a network configuration illustrated in FIG. 1 will be described. A communication scheme based on a Spatial Reuse Parameter (SRP) scheme (SRP based communication scheme), which is a prerequisite for the present embodiment, is a spatial reuse communication scheme corresponding to a feature of 802.11ax. More specifically, according to the SRP based communication scheme, in an environment in which a plurality of BSSs use a wireless space in the same frequency band, an access point belonging to one of the BSSs notifies a parameter value (SRP value) relating to an acceptable reception interference level, and terminals belonging to the other BSSs each determine a transmission level based on the value. This scheme enables efficient use of a wireless medium.

<Example of First Operation Sequence: SRP Scheme is Permitted>

Figure 5:
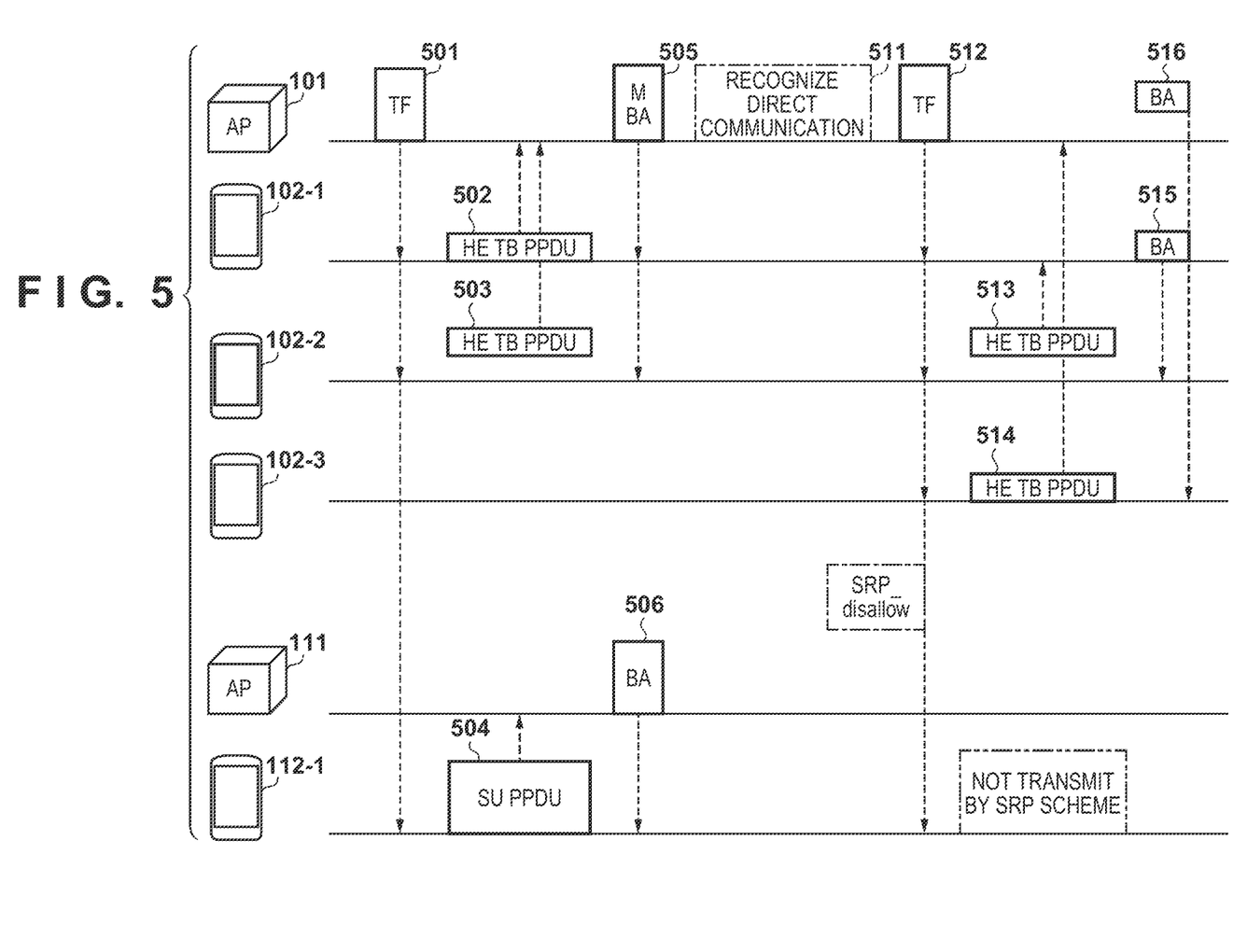
FIG. 5 illustrates an example of a first operation sequence and an example of a second operation sequence.

FIG. 5 illustrates a first example of operation sequence. The present operation sequence is a case where the destination of a frame activated by the TF is limited to the access point (uplink communication only). First, AP 101 transmits a TF 501 to activate a UL MU operation in the network 100 with BSSID: 1 managed by the AP 101. Any of the SRP values as illustrated in FIG. 4B is set in the UL Spatial Reuse field 323 in the TF 501. Note that UL MU is an abbreviation for Up Link Multi User and refers to simultaneous transmissions from a plurality of STAs to the AP. An STA having received the TF 501 transmits the frame after elapse of the SIFS time in a case where an RU is allocated to the STA. In the example in FIG. 5, an STA 102-1 transmits an HE TB PPDU frame 502 and an STA 102-2 transmits an HE TB PPDU frame 503. The time length of the HE TB PPDU frame is specified by the TF 501 (Length subfield 312 in FIG. 3B). Here, TB is an abbreviation for Trigger Based and PPDU is an abbreviation for Physical layer Protocol Data Unit. In other words, the HE TB PPDU frame refers to a frame transmitted and guided by the TF according to IEEE 802.11ax. Note that positions of the HE TB PPDU frame on the vertical axis in FIG. 5 simulate an RU frequency band used for frame transmission.

An STA 112-1 in the network 101 with BSSID: 2 network 101 using the same frequency band and channel as those of the network with BSSID: 1 can also receive the TF 501. Any of the SRP values as illustrated in FIG. 4B is set in the UL Spatial Reuse field 323 of the TF 501, and thus the STA 112-1 can recognize the SRP value. At this time, an SRP value of from 1 to 14 allows the STA 112-1 to transmit, with conditional transmit power, a Single User (SU) PPDU frame 504 destined for the AP 111. That is, transmit power is used that has a value smaller than a value obtained by subtracting a reception electric field intensity (Received Signal Strength Indicator (RSSI)) of the RF 501 from the power corresponding to the SRP value (a numerical value (dBm) obtained by adding the "transmit power for the TF" to the "value of reception interference acceptable by the AP (reception interference level)"). For example, as seen in FIG. 4B, an SRP value of 1 included in the Spatial Reuse 1 subfield 401 of the UL Spatial Reuse field 323 in the TF 501 corresponds to −80 dBm. The STA 112-1 transmits the SU PPDU frame 504 at a transmit power value smaller than a value resulting from subtraction of the reception electric field intensity of the RF 501 from −80 dBm.

Then, a value resulting from subtracting a loss of the wireless medium between the AP 101 and STA 112-1 from the transmit power for the SU PPDU frame 504 is smaller than the acceptable reception interference value. Thus, with the transmission of the SU PPDU frame 504 by the STA 112-1 prevented from affecting the reception processing of the AP 101, the AP 101 can correctly receive frames (HE TB PPDU frames 502 and 503) destined for the AP 101. This corresponds to prevention of the transmission (solid line) of a PPDU frame from STA 112-1 from affecting the reception (solid line), at the AP 101, of an HE TB PPDU frame from STA 102-3.

Subsequently, the AP 101 having received the HE TB PPDU frames 502 and 503 returns an MBA frame 505 as a response. MBA is an abbreviation for Multi-STA Block Ack (BA) in which responses to the plurality of STA are configured in one frame. Additionally, the AP 111 having received the SU PPDU frame 504 returns a Block Ack (BA) frame 506 as a response. In this manner, utilizing the SRP scheme allows effective use (reuse) of the wireless medium (space) between the network with BSSID: 1 and the network with BSSID: 2.

<Example of Second Operation Sequence: SRP Scheme is Prohibited During Sensing of Start of Direct Communication>

The present operation sequence assumes that direct communication between an STA 102-1 and an STA 102-2 is started. In FIG. 5, in which the first operating sequence has been described, after the AP 101 and the AP 111 transmit the MBA frame 505 and the BA frame 506, respectively, the AP 101 recognizes the start (performance) of the direct communication between the STA 102-1 and the STA 102-2 (operation 511). For example, the AP 101 can recognize the start of the direct communication by detecting signals related to the start of the direct communication and exchanged between the STA 102-1 and the STA 102-2, and detecting a signal related to the start of the direct communication via the AP 101. Note that direct communication refers to direct communication that does not pass through the AP and that is based on Direct Link Setup (DLS) or Tunneled DLS (TDLS) or Wi-Fi direct. Subsequently, the AP 101 transmits the TF. In this case, the AP 101 sets the SRP value in the TF 512 to 0 (zero) or 15. As illustrated in FIG. 4B, these SRP values mean that the SRP scheme is disallowed. Furthermore, the AP 101 includes, in the TF 512, RUs for the direct communication between STA 102-1 and STA 102-2 at TF 512.

The STA 102-2 having received the TF 512 recognizes, in the TF 512, the allocation of the RU for communication with STA 102-1 and transmits an HE TB PPDU frame 513 to the STA 102-1. Similarly, the STA 102-3 having received the TF 512 recognizes, in the TF 512, the allocation of the RU for MU UL communication and transmits an HE TB PPDU frame 514 to the AP 101. On the other hand, the STA 112-1 does not perform frame transmission based on the SRP scheme while the HE TB PPDU frames 513 and 514 are being transmitted.

The STA 102-1 having received the HE TB PPDU frame 513 transmits a BA frame 515 to the STA 102-2 as a response. Similarly, the AP 101 having received the HE TB PPDU frame 514 transmits a BA 516 frame to the STA 102-3 as a response. These responses (BA frames) are assumed to be based on an OFDMA communication scheme and to utilize the same RU as that used by the HE TB PPDU frame.

Thus, in the example of the second operation sequence, unlike in the example of the first operation sequence, the STA 112-1 is prevented from performing frame transmission after reception of the TF. This is because the SRP value indicated in the TF 511 indicates prohibition of the frame transmission based on the SRP scheme from being performed by the STAs in the other BSS network. Note that, with reference to FIG. 5, communication between two STAs has been described as the direct communication by way of example but that the TF may be configured such that the frame transmission based on the SRP scheme is prohibited also in a case where the direct communication is performed between two or more STAs.

<Example of Third Operation Sequence: SRP Scheme is Prohibited when AP Performs Full-Duplex Communication>

Figure 6:
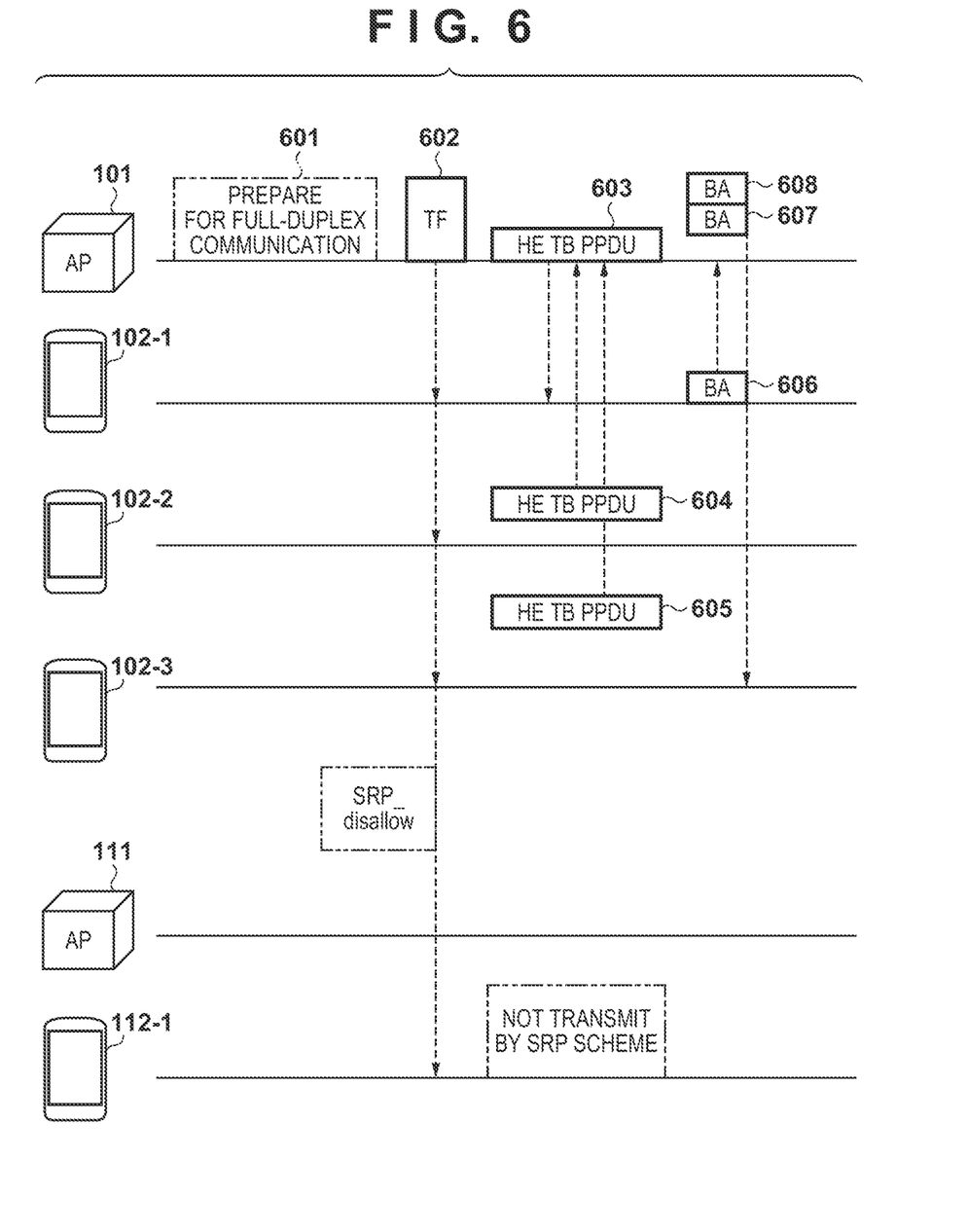
FIG. 6 illustrates an example of a third operation sequence.

FIG. 6 illustrates an example of a third operation sequence. In a case where the AP 101 is in a state in which full-duplex communication is executable, the AP 101 controls the communication unit 206 and the antenna 207 to prepare for full-duplex communication (operation 601). Note that it is assumed that the STAs 102-1 to 102-3 can receive a frame from the AP 101 after reception of the TF.

After the operation 601, the AP 101 transmits a TF 602. At this time, the AP 101 sets the SRP value to a value meaning that the SRP scheme is disallowed as in the example of the second operation sequence described above. Additionally, for the STA 102-1, the AP 101 includes, in the TF 602, an RU for downlink communication (communication in a direction from the AP 101 to the STA). Furthermore, for the STA 102-2 and the STA 102-3, the AP 101 includes, in the TF 602, an RU for MU UL communication. After transmitting the TF 602, the AP 101 transmits an HE TB PPDU frame 603 to the STA 102-1. The STA 102-2 having received the TF 602 recognizes, in the TF 602, the allocation of the RU for MU UL communication and transmits an HE TB PPDU frame 604 to the AP 101. Similarly, the STA 102-3 having received the TF 602 recognizes, in the TF 602, the allocation of the RU for MU UL communication and transmits an HE TB PPDU frame 605 to the AP 101. On the other hand, the STA 112-1 does not perform the frame transmission based on the SRP scheme while the HE TB PPDU frames 604 and 605 are being transmitted.

The STA 102-1 having received the HE TB PPDU frame 603 transmits a BA frame 606 as a response destined for the AP 101. Additionally, the AP 101 having received the HE TB PPDU frames 603 and 604 transmits BA frames 607 and 608 respectively destined for the STA 102-2 and the STA 102-3. Note that FIG. 6 illustrates a configuration in which the AP 101 transmits the HE TB PPDU frame to the single STA, but in a case of transmitting a data frame to a plurality of STAs, the AP 101 transmits frames in an HE MU PPDU format.

Note that, although not illustrated, in an example of an operation sequence corresponding to a combination of the examples of the second and third operation sequences, the TF may be configured such that the AP 101 also prohibits the SRP scheme in a case where the direct communication between a plurality of STA is started and where the AP 101 performs full-duplex communication.

Additionally, the AP 101 and the STAs 102-1 to 102-3 recognize information (operation capability and operation information) indicating that full-duplex communication is enabled (UL communication and DL communication are enabled), through a capability exchange procedure executed when the AP 101 connects to each STA.

Incidentally, FIG. 1 illustrates a case in which the TF from the AP 101 fails to reach the AP 111. This is because the present embodiment relates to operation of the STA having received the TF (i.e. STA 112-1) from the AP managing other BSS network (i.e. AP 101). In FIG. 1, in a case where the AP 111 or any STA (not illustrated) in the network 110 receives the TF from the AP 101, the use or non-use of the SRP scheme may be controlled for these STAs as is the case with the STA 112-1.

<Processing of AP 101>

Figure 7:
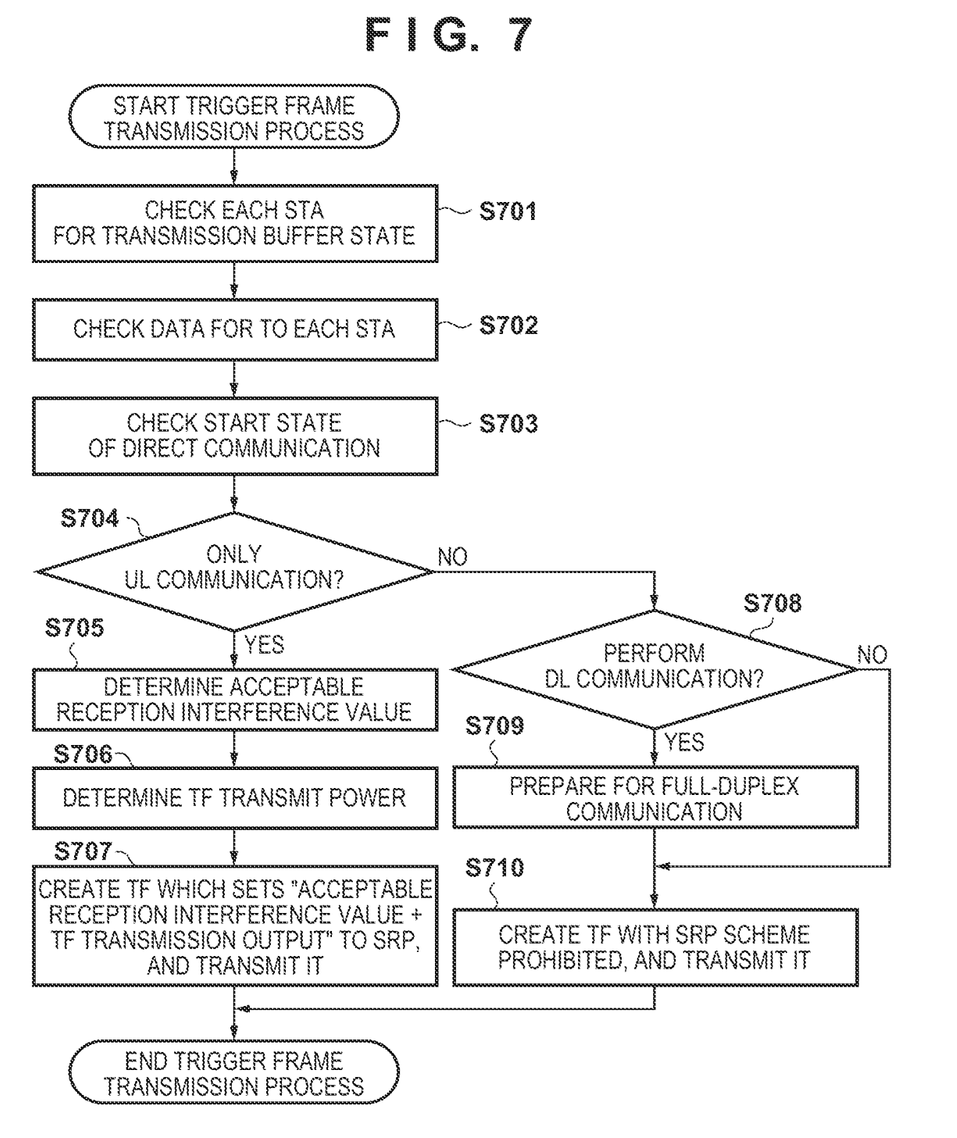
FIG. 7 is a flowchart illustrating a process performed by an access point.

FIG. 7 illustrates a flowchart of a trigger frame transmission process executed by the AP 101. The process in the present flowchart is implemented, for example, by the control unit 202 of the AP 101 by executing a program stored in the storage unit 201.

First, in S701, the AP 101 checks each STA connected to the AP 101 for a transmission buffer state. For example, the transmission buffer state can be checked by the signal analysis unit 213 by analyzing Buffer Status Reports (BSRs) from the STA 102-1 to 102-3 received by the reception unit 212 of the AP 101. The transmission buffer state may include the amount of data to be transmitted by each STA, the type of access category, a residence time in the buffer, etc.

Then, in S702, the signal analysis unit 213 of the AP 101 checks the data destined for each STA. For example, the signal analysis unit 213 checks for data directed from any STA in the network 100 to the same network 100 via the AP 101, or data directed from any STA outside the network 100, which is not illustrated, to any STA in the network 100. Furthermore, in S703, the AP 101 checks whether the direct communication is started between two or more STAs in the network 100. At this stage, the AP 101 recognizes a communication request that includes a communication partner apparatus (communication directionality) in the network 100 managed by the AP 101. Note that the user may set, via the input unit 204, the information related to the connection partner apparatus (directionality of communication) such that the AP 101 recognizes the information.

Subsequently, in S704, the determination unit 214 of the AP 101 determines the communication partner apparatus (the directionality of communication) of each STA in the network 100 based on check statuses in S702 and S703 and determines whether the communication guided (activated) by the TF is to be only the UL communication to the AP 101. In a case where only the UL communication to the AP 101 is determined to be performed, the process proceeds to S705. In S705, the frame generation control unit 215 determines an acceptable reception interference value (reception interference level) at the AP 101. Furthermore, in S706, the frame generation control unit 215 determines the value of the transmit power for the TF to be transmitted. The communication unit 206 performs a transmission process using the determined transmit power. In S707, the frame generation control unit 215 calculates a numerical value obtained by adding the determined TF transmit power to the determined acceptable reception interference value, determines the SRP value from a relationship table illustrated in FIG. 4B, and creates a TF configured with the SRP value. Thereafter, the transmission unit 211 transmits the created TF.

In a case where communication other than the UL communication to the AP 101 is also determined in S704 to be performed, the process proceeds to S708. In S708, the determination unit 214 determines whether to perform transmission from the AP 101 using the transmitted TF as a trigger, i.e., whether the directionality of communication includes downlink communication from the AP 101 to the STA. In a case where the downlink communication is performed, the process proceeds to S709 and otherwise the process proceeds to S710. In S709, the control unit 202 prepares for full-duplex communication. In S710, the frame generation control unit 215 creates a TF with the SRP scheme prohibited, and the transmission unit 211 transmits the created TF. Here, as illustrated in FIG. 4B, the prohibition corresponds to setting the SRP value to 0 (SRP_DISALLOW) or 15 (SRP_AND_NON_SRG_OBSS_PD_PROHIBITED).

In a case where the flowchart illustrated in FIG. 7 is associated with the examples of the first to third operation sequences described above, the example of the first operation sequence corresponds to the process proceeding from S704 to S707, the example of the second operation sequence corresponds to the process proceeding from S708 to S710, and the example of the third operation sequence corresponds to the process proceeding from S708 to S709 and the subsequent steps.

As described above, in a case where the directionality of communication in the network managed by the AP includes communication other than the uplink communication, that is, the destination of the frame guided by the TF includes a terminal (communication apparatus) other than the AP having transmitted the TF, control is provided such that no communication other than the SRP based communication is performed. Such operation enables the use of the SRP scheme to be appropriately controlled when the wireless medium is shared by APs and STAs belonging to a plurality of BSS networks, allowing exertion of an effect that facilitates efficient use of the wireless media. Additionally, the throughput of the overall system is improved.

Note that the embodiment described above is not limited to IEEE 802.11ax, and is similarly applicable to IEEE 802.11 series standards such as IEEE 802.11 Extremely/Extreme High Throughput (EHT).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-033029, filed on Feb. 26, 2019, which is hereby incorporated by reference herein in its entirety.

What is claimed is:

1. A communication apparatus that functions as an access point according to IEEE 802.11 series standards and that controls spatial reuse communication to be performed by a terminal station, comprising:
at least one memory that stores a set of instructions; and
at least one processor that executes the instructions for causing, when executed, the communication apparatus to perform operations comprising:
controlling to transmit a trigger frame including frequency band allocation information for communication based on Orthogonal Frequency Division Multiple Access (OFDMA); and
determining whether to allocate, by using the trigger frame, a frequency resource of the OFDMA to a communication different from an uplink communication in which a frame is transmitted to the access point,
wherein, in a case where it is determined to allocate, by using the trigger frame, the frequency resource of the OFDMA to the communication different from the uplink communication, information indicating that the spatial reuse communication is prohibited is included into the trigger frame, and information specifying the frequency resource allocated to the communication different from the uplink communication is included, as the frequency band allocation information, into the trigger frame,
wherein the information indicating that the spatial reuse communication is prohibited is stored in a UL Spatial Reuse subfield of a Common Info field in the trigger frame, and
wherein a value 15 is stored in the UL Spatial Reuse subfield of the Common Info field in the trigger frame, as the information indicating that the spatial reuse communication is prohibited, and a value from 1 to 14 is stored in the UL Spatial Reuse subfield of the Common Info field in the trigger frame in a case where it is determined the spatial reuse communication is to be permitted, wherein each value from 1 to 14 corresponds to a respective value for deriving transmission power to be used in the spatial reuse communication.

2. The communication apparatus according to claim 1, wherein the operations further comprise:
in a case where it is determined to allocate, by using the trigger frame, the frequency resource of the OFDMA to the uplink communication, controlling to transmit a second trigger frame including information indicating a value used to determine whether to perform the spatial reuse communication at other terminal station.

3. The communication apparatus according to claim 2, wherein the value is derived by using transmit power for the second trigger frame and a level of reception interference acceptable by the communication apparatus.

4. The communication apparatus according to claim 1, wherein
in the determining, in a case where direct communication between two or more terminal stations of the plurality of terminal stations is scheduled, it is determined to allocate, by using the trigger frame, the frequency resource of the OFDMA to the communication different from the uplink communication.

5. The communication apparatus according to claim 4, wherein the direct communication is communication based on Direct Link Setup (DLS), Tunneled DLS (TDLS), or Wi-Fi direct.

6. A control method performed by a communication apparatus that controls spatial reuse communication to be performed by a terminal station, the control method comprising:
controlling to transmit a trigger frame including frequency band allocation information for communication based on Orthogonal Frequency Division Multiple Access (OFDMA); and
determining whether to allocate, by using the trigger frame, a frequency resource of the OFDMA to communication different from uplink communication in which a frame is transmitted to the access point,
wherein in a case where it is determined to allocate, by using the trigger frame, the frequency resource of the OFDMA to the communication different from the uplink communication, information indicating that the spatial reuse communication is prohibited is included into the trigger frame, and information specifying the frequency resource allocated to the communication different from the uplink communication is included, as the frequency band allocation information, into the trigger frame,
wherein the information indicating that the spatial reuse communication is prohibited is stored in a UL Spatial Reuse subfield of a Common Info field in the trigger frame, and
wherein a value 15 is stored in the UL Spatial Reuse subfield of the Common Info field in the trigger frame, as the information indicating that the spatial reuse communication is prohibited, and a value from 1 to 14 is stored in the UL Spatial Reuse subfield of the Common Info field in the trigger frame in a case where it is determined the spatial reuse communication is to be permitted, wherein each value from 1 to 14 corresponds to a respective value for deriving transmission power to be used in the spatial reuse communication.

7. A communication apparatus that functions as an access point according to IEEE 802.11 series standards, and that controls spatial reuse communication to be performed by another communication apparatus, comprising:
at least one memory that stores a set of instructions; and
at least one processor that executes the instructions for causing, when executed, the communication apparatus to perform operations comprising:
transmitting, in a case where it is determined that a frequency resource is to be used for a communication different from an uplink communication in which a frame is transmitted to the access point, a trigger frame compliant with the IEEE 802.11 series standards, wherein the trigger frame includes at least information indicating the frequency resource to be used for the communication different from the uplink communication and information indicating that the spatial reuse communication is prohibited.

* * * * *